(12) United States Patent
Gerwig et al.

(10) Patent No.: US 9,311,137 B2
(45) Date of Patent: Apr. 12, 2016

(54) DELAYING INTERRUPTS FOR A TRANSACTIONAL-EXECUTION FACILITY

(71) Applicant: International Business Machines Corporation, Armonk, NY (US)

(72) Inventors: Guenter Gerwig, Simmozheim (DE); Christian Jacobi, Schoenaich (DE); Frank Lehnert, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 13/630,190

(22) Filed: Sep. 28, 2012

(65) Prior Publication Data

US 2014/0095851 A1  Apr. 3, 2014

(51) Int. Cl.
*G06F 9/38* (2006.01)
*G06F 9/48* (2006.01)
*G06F 9/52* (2006.01)

(52) U.S. Cl.
CPC ............ *G06F 9/4812* (2013.01); *G06F 9/3865* (2013.01); *G06F 9/4837* (2013.01); *G06F 9/528* (2013.01)

(58) Field of Classification Search
CPC ...................................................... G06F 9/528
See application file for complete search history.

(56) References Cited

U.S. PATENT DOCUMENTS

| | | | | |
|---|---|---|---|---|
| 5,613,129 A * | 3/1997 | Walsh | ...................... | G06F 13/24 710/262 |
| 5,619,704 A | 4/1997 | Yagi et al. | | |
| 5,708,814 A * | 1/1998 | Short | ...................... | G06F 13/24 710/260 |
| 6,065,089 A * | 5/2000 | Hickerson | ............. | G06F 9/4825 710/266 |
| 6,895,460 B2 | 5/2005 | Desoli et al. | | |
| 7,395,382 B1 | 7/2008 | Moir | | |
| 2005/0278719 A1 * | 12/2005 | Togawa | ................. | G06F 9/4887 718/100 |
| 2007/0143755 A1 * | 6/2007 | Sahu | ................... | G06F 9/30087 718/100 |
| 2007/0186085 A1 * | 8/2007 | Yim | ..................... | H03K 19/177 712/244 |
| 2011/0296148 A1 | 12/2011 | Cain, III et al. | | |
| 2012/0144128 A1 * | 6/2012 | Serebrin | ................. | G06F 9/467 711/149 |
| 2012/0210104 A1 * | 8/2012 | Danko | ................ | G06F 9/30076 712/229 |

OTHER PUBLICATIONS

"External Interruption", IBM Corporation, z/Architecture Principles of Operation, Chapter 6 Interruptions, SA22-7832-08, Ninth Edition, Aug. 2010, pp. 6-9 thru 6-13.

"Instruction Execution and Sequencing", IBM Corporation, z/Architecture Principles of Operation, Chapter 5, Program Execution, SA22-7832-08, Ninth Edition, Aug. 2010, pp. 5-11 thru 5-24.

(Continued)

*Primary Examiner* — Jacob A Petranek
(74) *Attorney, Agent, or Firm* — Francis Lammes; Stephen J. Walder, Jr.; Steven L. Bennett (57) ABSTRACT

A mechanism is provided for completing of set of instructions while receiving interrupts. The mechanism executes a set of instructions. Responsive to receiving an interrupt and determining that the interrupt requires processing within an implementation time frame, the mechanism delays the interrupt for a predetermined time period. Responsive to completing the set of instructions within the predetermined time period, the mechanism processes the interrupt.

20 Claims, 5 Drawing Sheets

(56) References Cited

OTHER PUBLICATIONS

Baugh, Lee et al., "Using Hardware Memory Protection to Build a High-Performance, Strongly-Atomic Hybrid Transactional Memory", Proceedings of the 35th Annual International Symposium on Computer Architecture (ISCA'08), http://www.cs.illinois.edu/homes/zilles/papers/ufo_hybridTM.isca2008.pdf, Washington D.C., 2008, pp. 115-126.

Carlstrom, Brian D. et al., "Executing Java programs with transactional memory", http://csl.stanford.edu/~christos/publications/2006.executing_java.scp.pdf, Computer Systems Laboratory, Stanford University, Stanford, CA, Received Nov. 29, 2005; received in revised form May 1, 2006; accepted May 18, 2006; Available online 4, Aug. 20, 19 pages.

Herlihy, Maurice et al., "Transactional Memory: Architectural Support for Lock-Free Data Structures", http://www.cs.brown.edu/~mph/HerlihyM93/herlihy93transactional.pdf; Proceedings of the 20th International Symposium on Computer Architecture (ISCA), 1993, pp. 289-300.

\* cited by examiner

DELAYING INTERRUPTS FOR A TRANSACTIONAL-EXECUTION FACILITY

BACKGROUND

The present application relates generally to an improved data processing apparatus and method and more specifically to mechanisms for delaying interrupts for transaction-execution facilities within processors.

A transactional-execution facility provides a concurrency mechanism designed to facilitate improved parallelism in a multiprocessing environment. When a transaction is successfully completed by a processor, multiple fetch and store accesses made by the processor appear to occur concurrently as observed by other processors and a channel subsystem. Successful completion of a transaction requires that storage accesses made during a transaction do not conflict with accesses made by other processors and by the channel subsystem. However, a transaction appears to a processor as a sequence of instructions, which may be aborted and retried.

Interrupts, such as an asynchronous timer interrupt, comparator interrupt, or the like, are a potential problem during such a transaction sequence, since these types of interrupts abort the transactional-execution (TX) sequences and could potentially prevent such a transactional-execution sequence from ever completing. Thus, some types of interrupts conflict with the requirement of a transaction to finally complete.

SUMMARY in one illustrative embodiment, a method, in a data processing system, is provided for executing a set of instructions while receiving interrupts. During execution of the set of instructions, the illustrative embodiment delays processing of a received interrupt for a predetermined time period in response to determining that the interrupt has an implementation time frame. The illustrative embodiment processes the interrupt in response to completing the set of instructions within the predetermined time period.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism enabling completion of a transactional-execution (TX) sequence when interrupts are received. The mechanism delays processing of an interrupt, such as an asynchronous timer interrupt, comparator interrupt, or the like, during the execution of a TX sequence while satisfying time consistency requirements. That is, interrupts may be shifted by some time and/or number of cycles as long as there is no conflict with explicit timing logging by instructions, such as store clock, store timer, or the like. The mechanism sets an interrupt delay value, which delays the interrupt until the TX sequence completes or a maximum delay value has been reached. When the delay value has not yet reached the maximum delay value and an interrupt causes an abort of the TX sequence, the delay value may be increased for a next TX sequence, so that the TX sequence may complete on retry, despite any other interrupt. Therefore, time consistency is maintained, since in such cases the delay accounts for timing rules.

Figure 1:
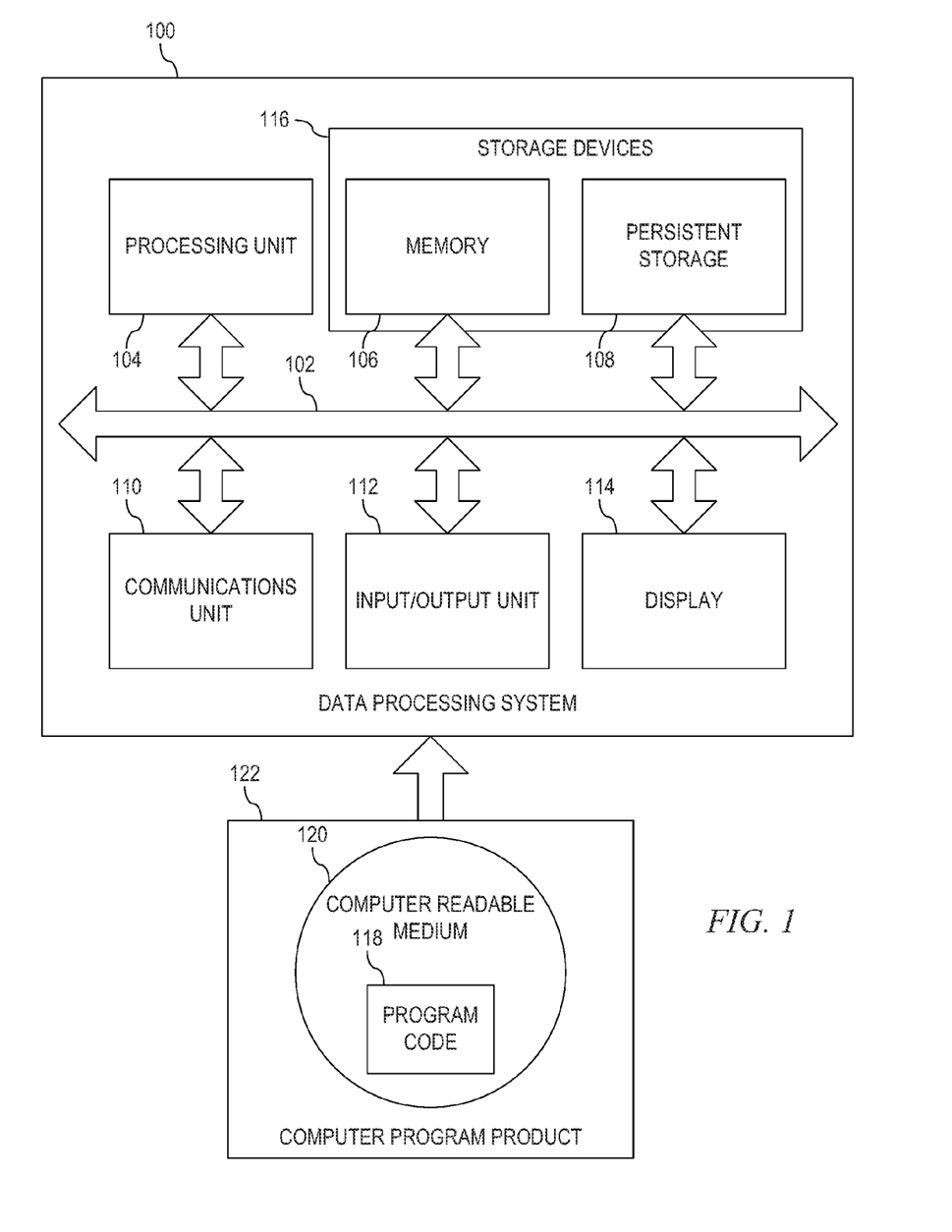
FIG. 1 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multiprocessor core, depending on the particular implementation.

Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Alternatively, program code 118 may be transferred to data processing system 100 from computer readable medium 120 through a communications link to communications unit 110 and/or through a connection to input/output unit 112. The communications link and/or the connection may be physical or wireless in the illustrative examples. Program code 118 and computer readable media 120 form computer program product 122 in these examples.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
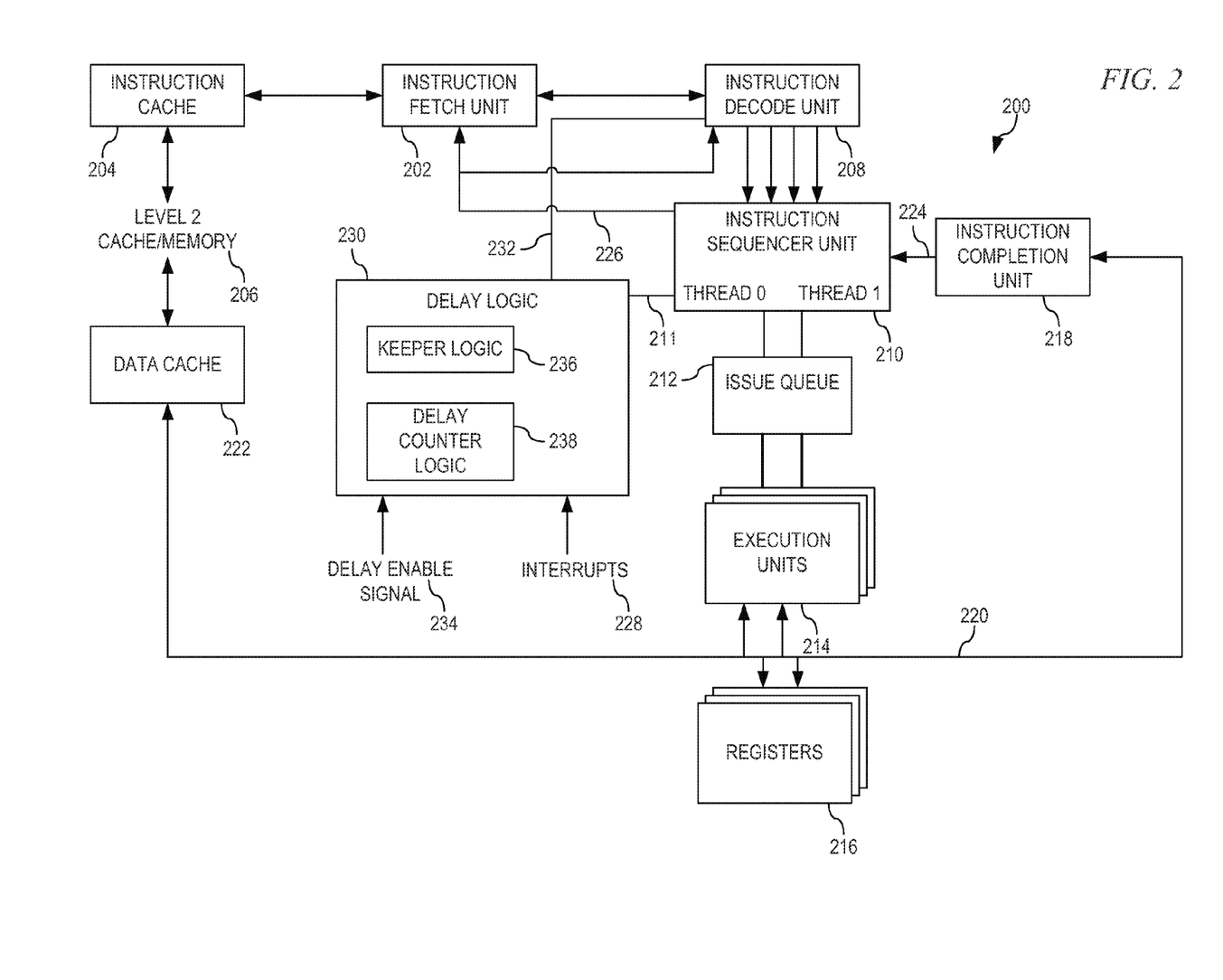
FIG. 2 depicts an exemplary block diagram of a processor design in which additional time and/or cycles are allocated for completion of transactional-execution (TX) sequences in the event of an interrupt in accordance with an illustrative embodiment.

Again, the illustrative embodiments are directed to a mechanism to allow completion of a transactional-execution (TX) sequence when interrupts are received. Accordingly, FIG. 2 depicts an exemplary block diagram of a processor design in which additional time and/or cycles are allocated for completion of transactional-execution (TX) sequences in the event of an interrupt in accordance with an illustrative embodiment. Processor 200 may be implemented as processing unit 106 in FIG. 1 in these illustrative examples. Processor 200 comprises a single integrated circuit superscalar microprocessor with an exemplary dual-thread simultaneous multi-threading (SMT) that may also be operated in a single threaded mode. Accordingly, as discussed further herein below, processor 200 includes various units, registers, buffers, memories, and other sections, all of which are formed by integrated circuitry.

As shown in FIG. 2, instruction fetch unit (IFU) 202 couples to instruction cache 204. Instruction cache 204 holds instructions for multiple programs (threads) to be executed, such as TX sequences. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 210.

Processor 200 may also include issue queue 212, which receives decoded instructions from ISU 210. Instructions are stored in the issue queue 212 while awaiting dispatch to the appropriate execution units. For an out-of order processor to operate in an in-order manner, ISU 210 may selectively issue instructions quickly using false dependencies between each instruction. If the instruction does not produce data, such as in a read after write dependency, ISU 210 may add an additional source operand (also referred to as a consumer) per instruction to point to the previous target instruction (also referred to as a producer). Issue queue 212, when issuing the producer, may then wakeup the consumer for issue. By introducing false dependencies, a chain of dependent instructions may then be created, whereas the instructions may then be issued only in-order. ISU 210 uses the added consumer for instruction scheduling purposes and the instructions, when executed, do not actually use the data from the added dependency. Once ISU 210 selectively adds any required false dependencies, then issue queue 212 takes over and issues the instructions in order for each thread, and outputs or issues instructions for each thread to execution units 214 of processor 200.

In an illustrative embodiment, execution units 214 of processor 200 are fully shared across both threads, meaning that execution units 214 may receive instructions from either or both threads. Processor 200 further comprises registers 216. In response to the instructions input from instruction cache 204 and decoded by instruction decode unit 208, ISU 210 selectively dispatches the instructions to issue queue 212 and then onto execution units 214 with regard to instruction type and thread. In turn, execution units 214 execute one or more instructions of a particular class or type of instructions. Instruction completion unit 218 monitors internal bus structure 220 to determine when instructions executing in execution units 214 are finished writing their operand results to registers 216. In addition to writing to registers 216, execution units 214 may also write to data cache 222 that may also have associated with it a non-cacheable unit (not shown) which accepts data from the processor and writes it directly to level 2 cache/memory 206. In this way, the non-cacheable unit bypasses the coherency protocols required for storage to cache.

Nonetheless, "completion" of an instruction means that the instruction is finishing executing in one of execution units 214, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order, and the completed data has to be updated as each instruction completes. Instruction completion unit 218 monitors for the completion of instructions, and sends control information 224 to ISU 210 to notify ISU 210 that more groups of instructions may be dispatched to execution units 214. ISU 210 sends dispatch signal 226, which serves as a throttle to bring more instructions down the pipeline to the dispatch unit, to 202 and instruction decode unit 208 to indicate that it is ready to receive more decoded instructions.

During executing of a current set of instructions, such as TX sequence, there may be events where ISU 210 receives one or more interrupts 228, such as an asynchronous timer interrupt, comparator interrupt, or the like, which normally cause ISU 210 to abort the current set of instructions and execute instructions associated with the one or more interrupts 228. However, in accordance with the illustrative embodiments, delay logic 230 provides a delay of the one or more interrupts 228 during the execution of a TX sequence while satisfying time consistency requirements. In order to provide this delay, delay logic 230, which may be hardware, software, or a combination of hardware and software, determines whether a transaction execution sequence or set of instructions is being executed based on transactional-execution (TX) sequence signal 232 from instruction decode unit 208 indicating the current set of instructions being executed is a TX set of instructions.

If TX sequence signal 232 is active indicating that the current set of instructions being executed is a TX set of instructions, delay logic 230 determines whether a preference has been set to delay interrupts during execution of the TX set of instructions, referred to as delay enable signal 234. If delay enable signal 234 is active and the TX sequence signal 232 is active indicating that the current set the current set of instructions being executed is a TX set of instructions, delay logic 230 activates a delay mode to delay any of the one or more interrupts 228 that may be received during execution of the TX set of instructions currently being executed. With the delay mode active and during execution of the TX set of instructions, if delay logic 230 receives an interrupt 228, delay logic 230 determines whether keeper logic 236 within delay logic 230 is already active. Keeper logic 236 maintains a state for interrupt 228 that is being delayed. If keeper logic 236 is not active, delay logic 230 determines whether the received interrupt 228 is an interrupt that has an implementation time frame in order that time consistency is maintained for the instructions associated with interrupt 228. If delay logic 230 determines that the received interrupt 228 fails to have an implementation time frame, then delay logic 230 aborts the received interrupt.

If delay logic 230 determines that the received interrupt 228 has an implementation time frame in order that time consistency is maintained for the instructions associated with interrupt 228 and since delay logic 230 activates to delay the interrupt 228 by activating keeper logic 236 and delay counter logic 238, which provides a safety for the received interrupt so that the received interrupt 228 is not delayed past the implementation time frame in order that time consistency is maintained. Delay counter logic 238 is logic that has a delay threshold that may be set to an initial delay value that is less than or equal to the implementation time frame required to process interrupt 228. However, the delay threshold may be increased or decreased based on the TX set of instructions being executed so that an amount of time to complete the TX set of instructions is provided by delay logic 230 in the event of receiving one or more interrupts 228 as tong as the time is less than the implementation time frame.

Once delay logic 230 activates keeper logic 236 and delay counter logic 238, then on each processor cycle, delay counter logic 238 increments a delay value. If during the delay of interrupt 228 the incremented delay value reaches the delay threshold, delay logic 230 forces the interrupt of the TX set of instructions causing an abort of the TX set of instructions by deactivating the keeper logic 236 which then processes the interrupt and resets the delay counter logic 238 to zero, thereby allowing the instruction associated with the received interrupt 228 to execute. Delay logic 230 issues the interrupt to instruction sequencer unit 210 via adjusted interrupt signal 211. If during the delay of interrupt 228 the TX set of instructions completes, then TX sequence signal 232 from instruction cache 204 will deactivate thereby clearing the delay by delay logic 230, processing received interrupt 228, and allowing the instruction associated with the received interrupt 228 to execute. Again, delay logic 230 issues the interrupt to instruction sequencer unit 210 via adjusted interrupt signal 211.

As stated previously, delay logic 230 may delay one or more interrupts 228 if a delay mode is active and, if so, for a predetermined delay threshold that may be set less than or equal to the implementation time frame associated with an interrupt 228 in order that time consistency is maintained. Thus, in an event that the delay mode is not set or the current delay threshold is not set to a value that is equal to the implementation time frame for interrupt 228 and a previous execution of the TX set of instructions was aborted for an interrupt such as interrupt 228, then delay logic 230 may either establish or modify the delay mode.

That is, delay logic 230 may determine whether a previous execution of the TX set of instructions was aborted due to an interrupt. If delay logic 230 determines that the previous execution of the transactional-execution (TX) set of instructions was aborted due to an interrupt, delay logic 230 determines whether the delay mode was being utilized. If delay logic 230 determines that the delay mode was not being utilized, then delay logic 230 sets delay enable signal 234 to active and sets the delay threshold within delay counter logic 238 to a small value, such as, for example, 1 microsecond. Then processor 200 may retry the TX set of instructions utilizing the delay mode.

If delay logic 230 determines that the delay mode was utilized, then the delay logic 230 may determine whether the current delay threshold is already equal to the implementation time frame for interrupt 228 in order that time consistency is maintained, which may also be referred to as a maximum delay value, such as, for example, 1 millisecond. If delay logic 230 determines that the current delay threshold is not equal to the maximum delay value, then delay logic 230 may increase the delay threshold within delay counter logic 238 by a small value, such as, for example, 1 microsecond. Then processor 200 may retry the TX set of instructions utilizing the new delay threshold. If the TX set of instructions is aborted again due to interrupt 228, then delay logic 230 may repeat the operation until such time as the delay threshold in the delay logic counter is set to a value equal to the maximum delay value. When this setting is reached, then processor 200 may retry the TX set of instructions utilizing the newest delay mode and if the TX set of instructions still cannot be completed due to interrupt 228, then delay logic 230 may report that the TX set of instructions may not be executed due to interrupts.

While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Therefore, the mechanisms of the illustrative embodiments set an interrupt delay value, which delays the interrupt until the TX set of instructions completes or a maximum delay value has been reached. When the delay value has not yet reached the maximum delay value and an interrupt causes an abort of the TX set of instructions, the delay value may be increased for a next TX set of instructions, so that the TX set of instructions may complete on retry, despite any other interrupt. Therefore, time consistency is maintained, since, in such cases, the delay does not violate timing rules.

Figure 3:
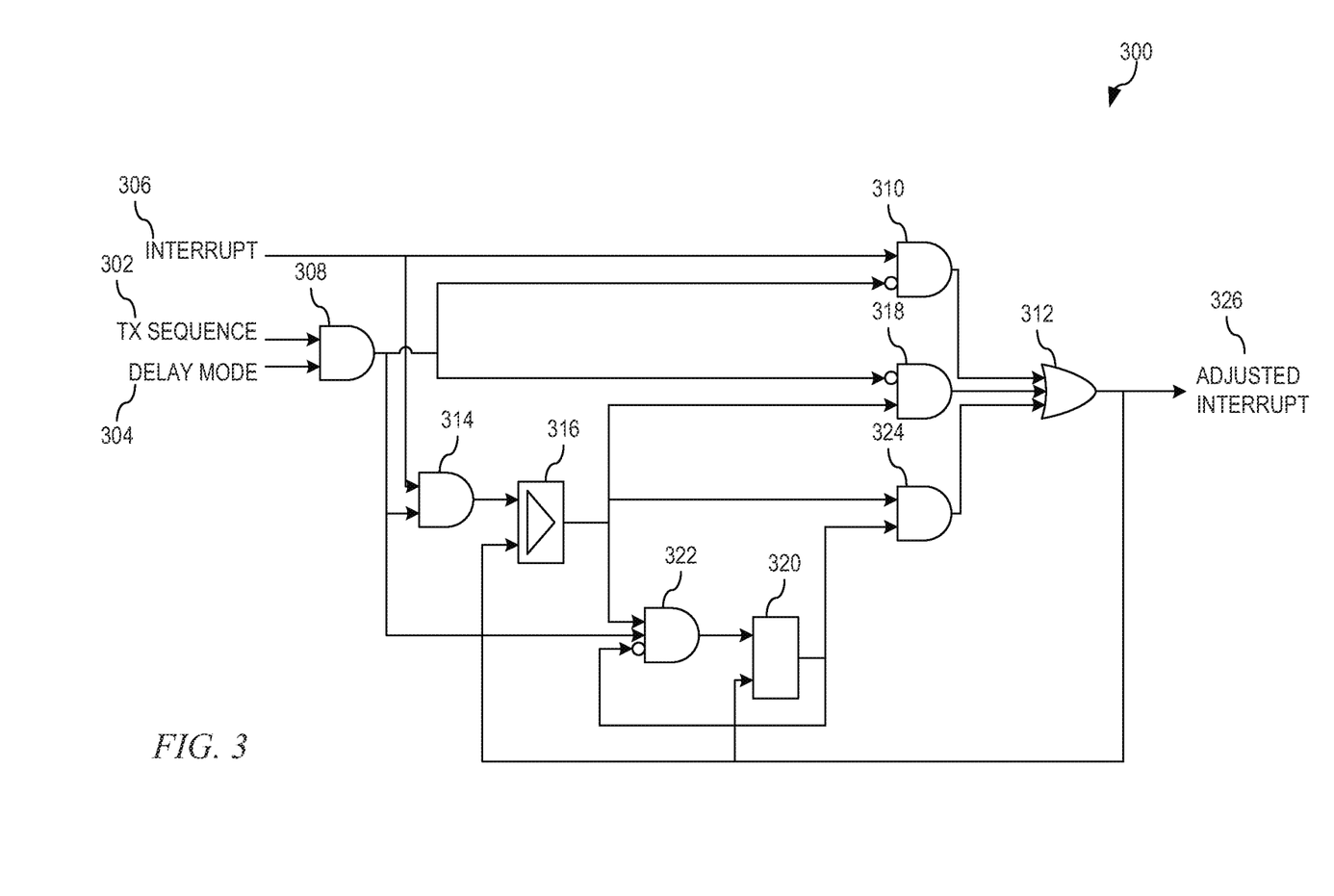
FIG. 3 depicts an example of one hardware implementation of delay logic, such as delay logic 230 of FIG. 2, in accordance with an illustrative embodiment.

As stated above, the delay logic of the illustrative embodiments may be hardware, software, or a combination of hardware and software. FIG. 3 depicts an example of one hardware implementation of delay logic, such as delay logic 230 of FIG. 2, in accordance with an illustrative embodiment. Delay logic 300 has three inputs: TX sequence signal 302, delay mode signal 304, and interrupt signal 306. As stated previously, if a current set of instruction being executed by a processor is a transactional-execution (TX) sequence, then TX sequence signal 302 will be active. Further, if a user indicates that a delay mode should be utilized or the delay logic has already aborted the TX sequence due to a previous interrupt, then delay mode signal 304 will also be active. Therefore, AND gate 308 will be active.

AND gate 308 provides input for a number of functions. For instance, if AND gate 308 is active and an interrupt is received thereby activating interrupt signal 306, then AND gate 310 will not be active because of the input from AND gate 308 be inversely input into AND gate 310, thereby preventing OR gate 312 from activating to an issue sequencer unit of the processor. Conversely, if AND gate 308 is not active due to a TX sequence not being executed (TX sequence signal 302 not active) and/or the delay mode not being active (delay mode signal 304 not active), then, if an interrupt is received thereby activating interrupt signal 306, AND gate 310 will be active because of the input from AND gate 308, which would be non-active, being inversely input into AND gate 310 and, thus, OR gate 312 will activate to send adjusted interrupt signal 326 to the issue sequencer unit of the processor.

AND gate 308 is also ANDed with interrupt signal 306 at AND gate 314. If AND gate 308 is active and interrupt signal 306 is active, then keeper latch 316 is activated. Keeper latch 316 maintains a state of the received interrupt signal 306. Once activated, the active signal from keeper latch 316 is ANDed with the signal from AND gate 308 at AND gate 318. Thus, if keeper latch 316 is active and AND gate 308 goes inactive due to the TX sequence completing, then AND gate 318 will be active because of the input from AND gate 308, which would be nm-active, being inversely input into AND gate 318 and, thus, OR gate 312 will activate to send an adjusted interrupt signal 326 to the issue sequencer unit of the processor.

Finally, AND gate 308 is also ANDed with the signal from keeper latch 316 and the output of delay counter 320 at AND gate 322. If AND gate 308 is active, keeper latch 316 is active and the output from delay counter 320 is inactive then AND gate 322 will be active which will cause delay counter 320 to increment a delay value on each processor cycle. Once the delay value increments to a delay threshold in the delay counter 320, delay counter 320 will activate. Therefore regardless of whether the TX sequence has completed, the output of delay counter 320 will be active which is ANDed with the active signal of keeper latch 316 at AND gate 324, which will then activate. Thus, OR gate 312 will activate to send an adjusted interrupt signal 326 to the issue sequencer unit of the processor. The active signal from OR gate 312 also resets keeper latch 316 as well as resets delay counter value in delay counter 320 to zero.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
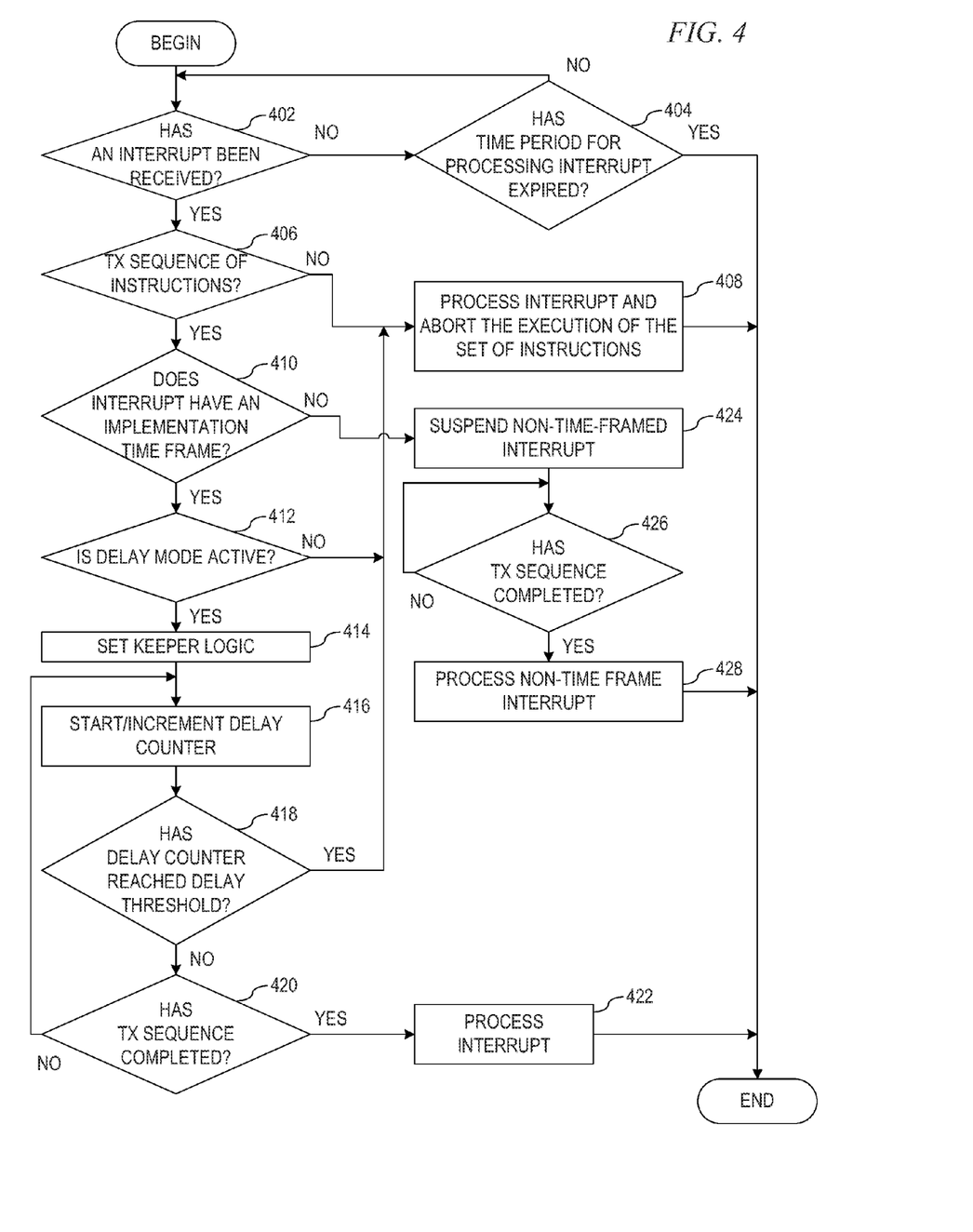
FIG. 4 depicts a flowchart of the operation performed by delay logic in accordance with an illustrative embodiment.

FIG. 4 depicts a flowchart of the operation performed by delay logic in a time period when an interrupt is received that should be processed immediately but needs to be delayed due to the execution of a current set of instructions, such as TX sequence, in accordance with an illustrative embodiment. As the operation begins, during the execution of a set of instructions, delay logic executed within a processor, determines whether an interrupt has been received (step 402). If at step 402 an interrupt has not been received, the delay logic determines whether the time period for processing an interrupt has expired (step 404). If at step 404 the time period for processing an interrupt has not expired, then the operation returns to step 402. If at step 404 the time period for processing an interrupt has expired, then the operation terminates.

If at step 402 an interrupt has been received, then the delay logic determines whether the set of instructions is a transaction-execution (TX) sequence of instructions (step 406). If at step 406 the set of instructions is not a TX sequence of instructions, then the delay logic processes the interrupt and aborts the execution of the set of instructions (step 408), with the operation terminating thereafter. If at step 406 the set of instructions is a TX sequence of instructions, the delay logic determines whether the interrupt has an implementation time frame (step 410).

If at step 410 the interrupt has an implementation time frame, the delay logic determines whether a delay mode is active (step 412). If at step 412 the delay mode is not active, then the operation proceeds to step 408. If at step 412 the delay mode is active, then the delay logic sets keeper logic in order to maintain a state for the interrupt that is being delayed (step 414) and starts a delay counter that is incremented on every processor cycle (step 416). It should be noted that the set of TX instruction are still being executed as the delay logic has not sent the interrupt to the instruction sequencer unit of the processor.

Then, on every clock cycle, the delay logic determines whether the delay counter has reached a predetermined delay threshold (step 418). If at step 418 the delay counter has not reached the predetermined delay threshold, the delay logic determines whether the set of TX instructions has completed execution (step 420). If at step 420 the set of TX instructions has completed, then the delay logic processes the delayed interrupt (step 422), with the operation terminating thereafter. If at step 420 the set of TX instructions has not completed, the operation returns to step 416. If at step 418 the delay counter has reached the predetermined delay threshold, then the operation proceeds to step 408.

Returning to step 410, if at step 410 the interrupt fails to have an implementation time frame, the delay logic suspends the non-time-framed interrupt (step 424) and determines whether the set of TX instructions has completed execution (step 426). If at step 426 the set of TX instructions has not completed the operation returns to step 426. If at step 426 the set of TX instructions has completed, then the delay logic processes the non-time-framed interrupt (step 428), with the operation terminating thereafter.

Figure 5:
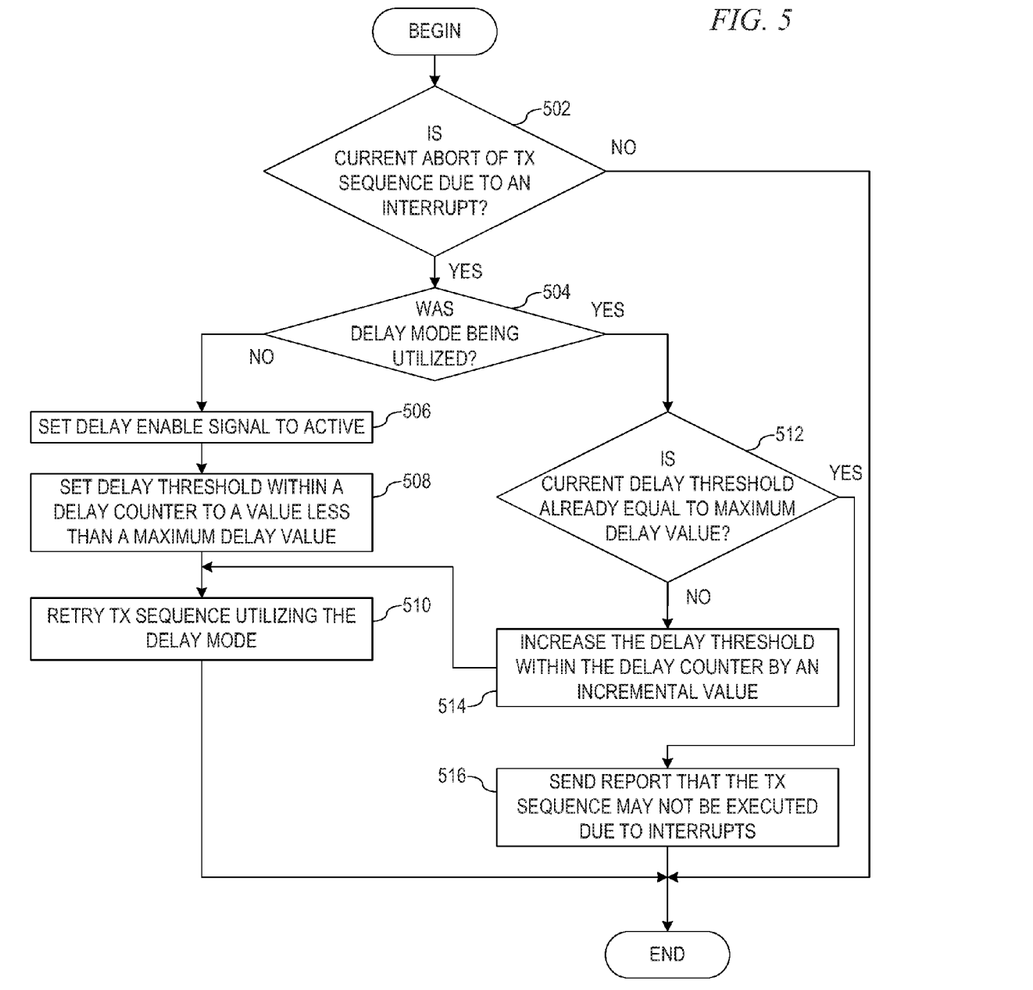
FIG. 5 depicts a flowchart of the operation performed by delay logic enabling or modifying the delay mode executed by the delay logic in the accordance with an illustrative embodiment.

FIG. 5 depicts a flowchart of the operation performed by delay logic enabling or modifying the delay mode executed by the delay logic in the accordance with an illustrative embodiment. The operation performed in FIG. 5 is executed as a result of a current abort of a TX set of instructions. As the operation begins, the delay logic determines whether a current abort of the TX set of instructions is due to an interrupt (step 502). If at step 502 the delay logic determines that the current abort of the TX set of instructions is not due to an interrupt but for some other reason, then the operation terminates. If at step 502 the delay logic determines that the current abort of the TX set of instructions is due to an interrupt, then the delay logic determines whether the delay mode was being utilized (step 504). If at step 504 the delay logic determines that the delay mode was not being utilized, then the delay logic sets delay enable signal to active (step 506) thereby activating a delay mode and sets the delay threshold within a delay counter to a value less than a maximum delay value (step 508). A processor then retries the TX set of instructions utilizing the delay mode (step 510), with the operation terminating thereafter.

If at step 504 the delay logic determines that the delay mode was utilized, then the delay logic determines whether the current delay threshold is already equal to the maximum delay value (step 512). If at step 512 the delay logic determines that the current delay threshold is not equal to the maximum delay value, then the delay logic increases the delay threshold within the delay counter by an incremental value (step 514), with the operation proceeding to step 510 thereafter. If the at step 512 the delay logic determines that the current delay threshold is equal to the maximum delay value, then the delay logic sends a report that the TX set of instructions may not be executed due to interrupts (step 516), with the operation terminating thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for enabling completion of a transactional-execution (TX) sequence when interrupts are received. The mechanism delays processing of an interrupt, such as an asynchronous timer interrupt, comparator interrupt, or the like, during the execution of a TX sequence while satisfying time consistency requirements. That is, interrupts may be shifted by some time and/or number of cycles as long as there is no conflict with explicit timing logging by instructions, such as store clock, store timer, or the like. The mechanism sets an interrupt delay value, which delays the interrupt until the TX sequence completes or a maximum delay value has been reached. When the delay value has not yet reached the maximum delay value and an interrupt causes an abort of the TX sequence, the delay value may be increased for a next TX sequence, so that the TX sequence may complete on retry, despite any other interrupt. Therefore, time consistency is maintained, since in such cases the delay accounts for timing rules.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method implemented by a data processing system, for executing a set of instructions while receiving interrupts, the method comprising:
   executing a set of instructions;
   receiving an interrupt;
   responsive to determining that the interrupt fails to have an implementation time frame, suspending processing of the interrupt for a predetermined time period;
   responsive to completing the set of instructions within the predetermined time period, processing the interrupt;
   responsive to determining that the interrupt has an implementation time frame, determining whether a delay mode is active;
   responsive to the delay mode being active, delaying processing of the interrupt, thereby forming a delayed interrupt, and setting keeper logic in order to maintain a state for the delayed interrupt;
   starting a delay counter that incremented on every processor cycle;
   on every clock cycle:
      determining whether the delay counter has reached a predetermined delay threshold;
      responsive to the delay counter failing to have reached the predetermined delay threshold, determining whether the set of instructions has completed execution;
      responsive to the set of instructions completing execution, processing the delayed interrupt;
      responsive to the set of instructions failing to have completed execution, incrementing the delay counter; and
      responsive to the delay counter reaching the predetermined delay threshold, processing the delayed interrupt and aborting the set of instructions; and responsive to the delay mode failing to be active, processing the delayed interrupt and aborting the set of instructions.

2. The method of claim 1, wherein the set of instructions are a transactional-execution set of instructions.

3. The method of claim 1, wherein the interrupt is at least one of an asynchronous timer interrupt or comparator interrupt.

4. The method of claim 1, further comprising:
responsive to a failure to complete the set of instruction within the predetermined time period, processing the interrupt; and
aborting the set of instructions.

5. The method of claim 1, further comprising:
responsive to aborting the set of instructions due to the interrupt, determining whether the delay mode was utilized;
responsive to a determination that the delay mode was utilized, determining whether a current delay threshold is equal to a maximum delay value;
responsive to the current delay threshold failing to be equal to the maximum delay value, increasing the current delay threshold by an incremental value thereby forming a new delay threshold; and
retrying the set of instructions with the new delay threshold.

6. The method of claim 5, further comprising:
responsive to the current delay threshold being equal to the maximum delay value, sending a report that the set of instructions are not executable due to interrupts.

7. The method of claim 5, further comprising:
responsive to a determination that the delay mode failed to be utilized, activating the delay mode with an initial delay threshold that is not equal to a maximum delay value; and
retrying the set of instructions with the new delay threshold.

8. A computer program product comprising a non-transitory computer readable storage medium having a computer readable program stored therein, wherein the computer readable program, when executed on a computing device, causes the computing device to:
execute a set of instructions;
receive an interrupt;
responsive to determining that the interrupt fails to have an implementation time frame, suspend processing of the interrupt for a predetermined time period; and
responsive to completing the set of instructions within the predetermined time period, process the interrupt
responsive to determining that the interrupt implementation time frame, determine whether a delay mode is active;
responsive to the delay mode being active, delay processing of the interrupt, thereby forming a delayed interrupt, and set keeper logic in order to maintain a state for the delayed interrupt;
start a delay counter that is incremented on every processor cycle;
on every clock cycle:
determine whether the delay counter has reached a predetermined delay threshold;
responsive to the delay counter failing to have reached the predetermined delay threshold, determine whether the set of instructions has completed execution;
responsive to the set of instructions completing execution, process the delayed interrupt;
responsive to the set of instructions failing to have completed execution, increment the delay counter; and
responsive to the delay counter reaching the predetermined delay threshold, process the delayed interrupt and aborting the set of instructions; and
responsive to the delay mode failing to be active, process the delayed interrupt and aborting the set of instructions.

9. The computer program product of claim 8, wherein the set of instructions are a transactional-execution set of instructions.

10. The computer program product of claim 8, wherein the interrupt is at least one of an asynchronous timer interrupt or comparator interrupt.

11. The computer program product of claim 8, wherein the computer readable program further causes the computing device to:
responsive to a failure to complete the set of instruction within the predetermined time period, process the interrupt; and
abort the set of instructions.

12. The computer program product of claim 8, wherein the computer readable program further causes the computing device to:
responsive to aborting the set of instructions due to the interrupt, determine whether the delay mode was utilized;
responsive to a determination that the delay mode was utilized, determine whether a current delay threshold is equal to a maximum delay value;
responsive to the current delay threshold failing to be equal to the maximum delay value, increase the current delay threshold by an incremental value thereby forming a new delay threshold; and
retry the set of instructions with the new delay threshold.

13. The computer program product of claim 12, wherein the computer readable program further causes the computing device to:
responsive to the current delay threshold being equal to the maximum delay value, send a report that the set of instructions are not executable due to interrupts.

14. The computer program product of claim 12, wherein the computer readable program further causes the computing device to:
responsive to a determination that the delay mode failed to be utilized, activate the delay mode with an initial delay threshold that is not equal to a maximum delay value; and
retry the set of instructions with the new delay threshold.

15. An apparatus, comprising:
a processor; and
a memory coupled to the processor, wherein the memory comprises instructions which, when executed by the processor, cause the processor to:
execute a set of instructions;
receive an interrupt;
responsive to determining that the interrupt fails to have an implementation time frame, suspend processing of the interrupt for a predetermined time period; and
responsive to completing the set of instructions within the predetermined time period, process the interrupt
responsive to determining that the interrupt has an implementation time frame, determine whether a delay mode is active;
responsive to the delay mode being active, delay processing of the interrupt, thereby forming a delayed interrupt, and set keeper logic in order to maintain a state for the delayed interrupt;
start a delay counter that s incremented on every processor cycle;
on every clock cycle:
  determine whether the delay counter has reached a predetermined delay threshold;
  responsive to the delay counter failing to have reached the predetermined delay threshold, determine whether the set of instructions has completed execution;
  responsive to the set of instructions completing execution, process the delayed interrupt;
  responsive to the set of instructions failing to have completed execution, increment the delay counter; and
  responsive to the delay counter reaching the predetermined delay threshold, process the delayed interrupt and aborting the set of instructions; and
responsive to the delay mode failing to be active, process the delayed interrupt and aborting the set of instructions.

16. The apparatus of claim 15, wherein the set of instructions are a transactional-execution set of instructions, and wherein the interrupt is at least one of an asynchronous timer interrupt or comparator interrupt.

17. The apparatus of claim 15, wherein the instructions further cause the processor to:
  responsive to a failure to complete the set of instruction within the predetermined time period, process the interrupt; and
  abort the set of instructions.

18. The apparatus of claim 15, wherein the instructions further cause the processor to:
  responsive to aborting the set of instructions due to the interrupt, determine whether a delay mode was utilized;
  responsive to a determination that the delay mode was utilized, determine whether a current delay threshold is equal to a maximum delay value;
  responsive to the current delay threshold failing to be equal to the maximum delay value, increase the current delay threshold by an incremental value thereby forming a new delay threshold; and
  retry the set of instructions with the new delay threshold.

19. The apparatus of claim 18, wherein the instructions further cause the processor to:
  responsive to the current delay threshold being equal to the maximum delay value, send a report that the set of instructions are not executable due to interrupts.

20. The apparatus of claim 18, wherein the instructions further cause the processor to:
  responsive to a determination that the delay mode failed to be utilized, activate the delay mode with an initial delay threshold that is not equal to a maximum delay value; and
  retry the set of instructions with the new delay threshold.

* * * * *